United States Patent [19]
Bales et al.

[11] Patent Number: 5,337,979
[45] Date of Patent: Aug. 16, 1994

[54] TRACK FITTING FOR AIRCRAFT SEATS

[75] Inventors: Randy J. Bales, Nocona; Klay E. Gilbert; Steven R. Bell, both of Lindsay, all of Tex.

[73] Assignee: Weber Aircraft, Inc., Gainesville, Tex.

[21] Appl. No.: 829,961

[22] Filed: Feb. 3, 1992

Related U.S. Application Data

[63] Continuation-in-part of Ser. No. 809,405, Dec. 18, 1991, Pat. No. D. 333,420.

[51] Int. Cl.$^5$ ............................................. B64D 11/06
[52] U.S. Cl. ............................. 244/118.1; 248/503.1; 410/105; 410/115; 244/118.6; 244/122 R
[58] Field of Search ............... 244/118.5, 118.6, 122; 248/429, 503.1; 410/101, 105, 115; 296/65.1

[56] References Cited

U.S. PATENT DOCUMENTS

| | | |
|---|---|---|
| 2,899,167 | 8/1959 | Elsner .................... 248/429 |
| 3,189,313 | 6/1965 | Burns et al. . |
| 3,620,171 | 11/1971 | Brenia et al. . |
| 3,622,202 | 11/1971 | Brown .................... 248/429 |
| 3,652,050 | 3/1972 | Marrujo et al. .......... 248/429 |
| 3,677,195 | 7/1972 | Prete, Jr. . |
| 3,810,534 | 5/1974 | Prete, Jr. . |
| 4,026,218 | 5/1977 | Prete, Jr. et al. . |
| 4,062,298 | 12/1977 | Weik . |
| 4,109,891 | 8/1978 | Grendahl . |
| 4,114,947 | 9/1978 | Nelson . |
| 4,256,424 | 3/1981 | Knox et al. . |
| 4,396,175 | 8/1983 | Long et al. . |
| 4,493,470 | 1/1985 | Engel . |
| 4,509,888 | 4/1985 | Sheek . |
| 4,688,843 | 8/1987 | Hall . |
| 4,708,549 | 11/1987 | Jensen . |
| 4,718,719 | 1/1988 | Brennan . |
| 4,771,969 | 9/1988 | Dowd . |
| 4,796,837 | 1/1989 | Dowd .................... 410/105 |
| 4,911,381 | 3/1990 | Cannon et al. . |
| 5,058,829 | 10/1991 | Bentley . |

FOREIGN PATENT DOCUMENTS

2556000 6/1977 Fed. Rep. of Germany ...... 410/105

*Primary Examiner*—Galen L. Barefoot
*Attorney, Agent, or Firm*—Crutsinger & Booth

[57] ABSTRACT

A seat leg and track fitting assembly for removably securing a seat to a generally channel-shaped track secured to the fuselage of an aircraft. The track fitting assembly includes a forged body member having a narrow finger portion; a plurality of spaced track lugs projecting laterally from the narrow finger portion, and an enlarged boss portion having a recess formed therein. The recess extends through the narrow finger portion to form a pair of shoulders adjacent opposite sides of the recess and a plunger has surfaces positioned between the shoulders such that the shoulders limit movement of the plunger. An actuating arm is secured to the plungers in each of a plurality of track fitting assemblies to move the plungers in the recesses between first positions wherein the lower ends of the plungers are positioned adjacent the lower edge of the narrow finger portion of each body and an elevated position wherein the plungers are retracted from the track.

17 Claims, 5 Drawing Sheets

TRACK FITTING FOR AIRCRAFT SEATS

CROSS REFERENCE TO RELATED APPLICATIONS

This application is a continuation-in-part of an application for design patent Ser. No. 07/809,405, filed Dec. 18, 1991 entitled "TRACK FITTING" (now patent Ser. No. 333,420); the disclosure of which is incorporated herein by reference for all purposes.

TECHNICAL FIELD

The invention relates to track fittings for removably securing legs of aft facing seats to tracks mounted on the floor of an aircraft or other vehicle, wherein an actuating arm is connected to plungers in a plurality of track fittings to facilitate installing and removing seats.

BACKGROUND OF INVENTION

Aircraft are often used for transporting both cargo and personnel. Seats must be installed for transporting personnel and removed for transporting cargo.

Seats in the aircraft are secured by track fittings to tracks mounted in the floor of the aircraft. One such fitting, disclosed in U.S. Pat. No. 4,771,969 entitled "LEG SET TRACK FITTING," is commercially available from Sabre Industries, Inc. of Burbank, Calif. The fitting has a generally circular head section which pivots about a horizontal axis relative to one end of a finger which extends into the groove in a track such that the head is movable into openings in the track to prevent movement of the fitting longitudinally of the track. The fitting is also provided with a yoke configured to straddle the finger and extend into openings in the track.

For removing a seat equipped with track fittings of the type disclosed in U.S. Pat. No. 4,771,969, a tool is required for disengaging the head section of the fitting from openings in the track and a screwdriver is required for disengaging the yoke section from the track.

Often, a different track fitting, for example, of the type commercially available from Ancra Corporation of El Segundo, Calif., and disclosed in U.S. Pat. No. 4,256,424 entitled "RATTLE PROOF ANCHOR FITTING FOR SECURING LOADS TO A RETAINER TRACK", may be employed for securing a front or foreleg of a seat to a track while a fitting of the type disclosed in U.S. Pat. No. 4,771,969 is employed for securing the rear or aft leg to the track. This fitting may require a third tool for installing and removing a seat.

Other track fittings are disclosed in U.S. Pat. Nos. 3,189,313; 3,620,171; 3,652,050; 3,677,195; 3,810,534; 4,026,218; 4.062,298; 4,109,891; 4,114,947; 4,396,175; 4,493,470; 4,509,888; 4,688,843; 4,708,549; 4,718,719 and 4,911,381.

Installing and removing seats using track fittings which require the use of tools of the type hereinbefore described may require between ten and fifteen minutes for each seat. Several manhours of labor are required for converting the aircraft, which has been used for transporting cargo, for transporting personnel.

The heavy seats, which may weigh about one hundred (100) pounds or more, are sometimes handled roughly which results in damaging the track fittings and the tracks.

Further, the requirement that several tools be employed for installing or removing seats is undesirable.

A long felt need exists for track fittings which permit installation and removal of seats much more quickly than can be accomplished using track fittings of the type heretofore devised.

SUMMARY OF INVENTION

The track fitting disclosed herein is employed for movably securing a seat to conventional, generally channel shaped tracks having an elongated central groove and spaced circular openings formed in horizontally extended flanges. One embodiment of the improved track fitting incorporates a body member having a long narrow finger portion which has a width less than the width of the groove formed in the track such that a lower surface on the finger extends into the groove in the fitting and is locked in position adjacent the floor of the track. The body member has an enlarged boss portion adjacent one end of the narrow finger portion and a recess extends through the narrow finger portion into the boss portion to form a housing for a plunger which is movable relative to the track for securing the fitting against sliding movement longitudinally of the track. The recess is configured to form a pair of spaced shoulders adjacent opposite sides of the plunger to significantly increase the load carrying capability of the plunger.

It is important to note that the shoulders formed adjacent opposite sides of the recess formed through the narrow finger supports the plunger along substantially its entire length. A long stem on the plunger extends through the enlarged boss portion of the body and is connected to an actuating arm which extends to a stem portion of a plunger on a track fitting on another leg of the seat such that the actuating arm can be manipulated to simultaneously move plungers in fittings on different legs of the aircraft seat. Further, the apparatus incorporates a locking mechanism for securing the actuating arm to maintain plungers in a plurality of track fittings in a retracted position to facilitate positioning fittings in the tracks while allowing the fittings to be locked in a desired position by merely releasing the actuating arm.

The improved track fittings are configured to permit use of identical track fittings on both fore and aft legs of the aircraft seat which significantly reduces the number of fittings which must be maintained as spare parts.

The body of the fitting is forged in a configuration which requires a minimum of machining which significantly reduces the manufacturing cost of the track fitting.

DESCRIPTION OF DRAWINGS

Drawings of a preferred embodiment of the invention are annexed hereto so that the invention may be better and more fully understood, in which.

Numeral references are employed to designate like parts throughout the various figures of the drawings.

DESCRIPTION OF A PREFERRED EMBODIMENT

Figure 1:
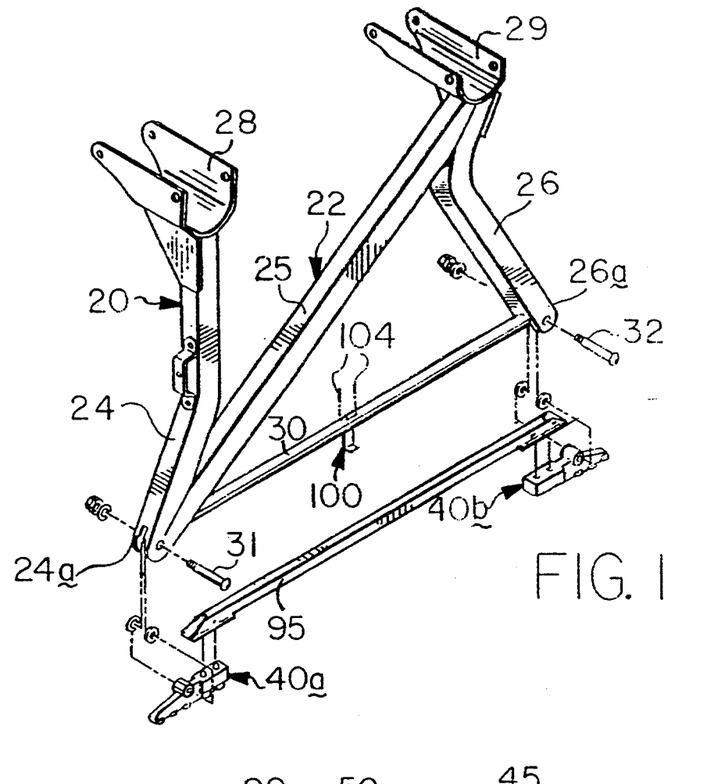
FIG. 1 is an exploded perspective view of an aircraft seat leg and fitting assembly.
Figure 10:
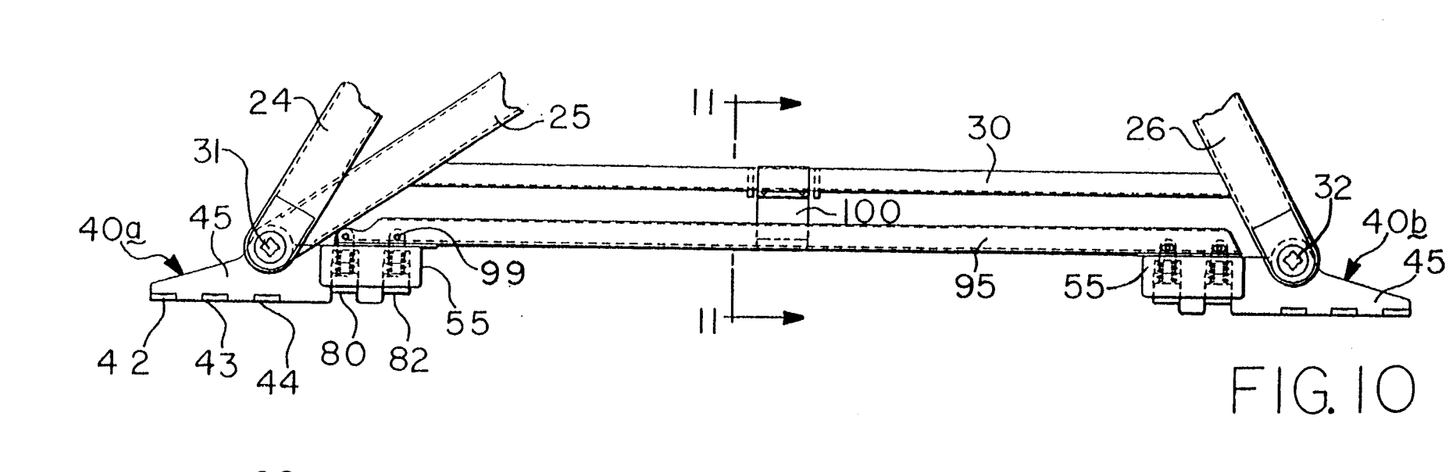
FIG. 10 is a fragmentary side elevational view of an aircraft seat leg and fitting assembly.

Referring to FIGS. 1 and 10 of the drawing, the numeral 20 generally designates an aircraft seat leg and track fitting assembly including a leg assembly generally designated by the numeral 22 and a pair of track fitting assemblies 40a and 40b. In the illustrated embodiment track fitting assemblies 40a and 40b are of substantially identical construction; however, one fitting assembly 40a is secured to the front leg 24 and the other track fitting assembly 40b is secured to the rear leg 26 of leg assembly 22.

The leg assembly 22 for an airplane seat includes a front seat leg 24 and a rear seat leg 26 joined by a diagonally extending brace 25. It should be appreciated that for an aft facing seat, the front leg 24 of the seat is facing the rear or aft portion of the aircraft and that the rear seat leg 26 is positioned toward the front or fore portion of the aircraft. Saddles 28 and 29 are secured to upper ends of legs 24 and 26 for attachment to cross rails on a base frame assembly on an aircraft seat (not shown) in conventional manner. A cylindrical torque tube 30 has opposite ends welded or otherwise rigidly secured to lower ends of legs 24 and 26. Openings in legs 24 and 26 receive screws 31 and 32 for securing track fitting assemblies 40a and 40b to lower ends of the legs, as will be hereinafter more fully explained.

Track fitting assemblies 40a and 40b are preferably of identical construction and secure the leg assembly 22 to a conventional track 35, as illustrated in FIGS. 3, 4, 5, 7, 8 and 9 of the drawing.

Figure 7:
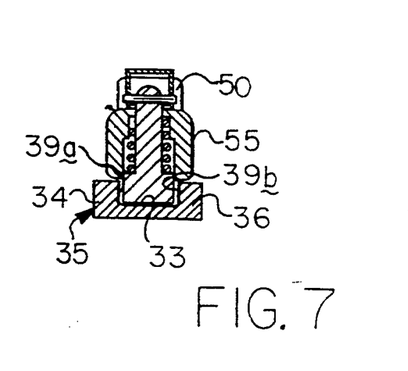
FIG. 7 is a cross-sectional view taken substantially along line 7—7 of FIG. 3.
Figure 8:
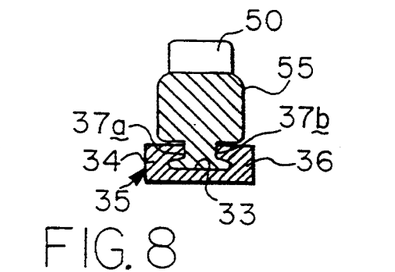
FIG. 8 is a cross-sectional view taken along line 8—8 of FIG. 3.
Figure 9:
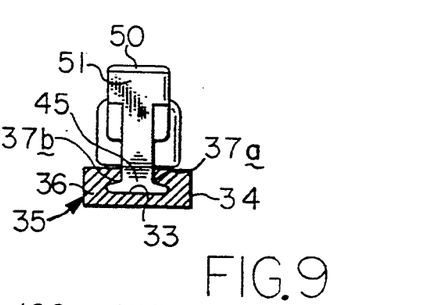
FIG. 9 is a cross-sectional view taken along line 9—9 of FIG. 3.

Referring to FIGS. 7, 8 and 9 of the drawing, the conventional seat track 35 comprises a generally channel-shaped member bolted or otherwise secured to the fuselage of an aircraft. A typical track comprises a bottom wall 33 extending between spaced side walls 34 and 36 which have inwardly extending flange portions 37a and 37b spaced apart to form a groove 38 extending longitudinally of the track 35. Generally crescent shaped openings 39a and 39b are formed in flanges 37a and 37b to form a series of circular receptacles 39 spaced longitudinally of track 35. The receptacles 39 formed by crescent shaped openings 39a and 39b are typically spaced on one inch (2.54 cm.) centers along the length of the track and generally have a diameter of approximately 1.00 inch (2.54 cm.).

Track 35 is of conventional design and forms no part of the invention except in combination with the seat leg and track fitting assembly described herein. A portion of a typical track 35 is illustrated in FIGS. 3, 4, and 7–9 of the drawing to illustrate the cooperative relationship between track fittings 40a and 40b and the track 35. It will be appreciated that track section 35 has a typical cross-section and that other configurations may be employed, for example, tracks of the type disclosed in U.S. Pat. Nos. 3,652,050; 4,109,891; 4,114,947; 4,493,470; and 4,911,381.

It should be readily apparent that tracks 35 and track fittings 40a and 40b may be employed for mounting structure other than aircraft seats, such as cargo pallets or tie-down straps to the floor of aircraft, trucks, ships, buildings and other structures or for mounting seats in busses, trains and other vehicles.

Figure 2:
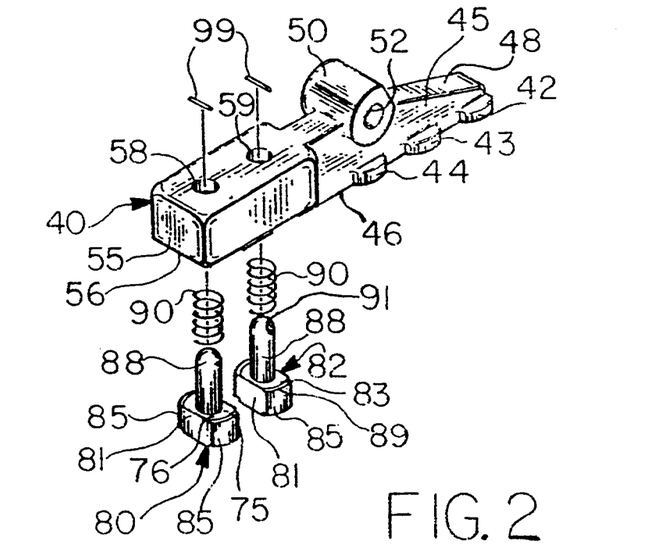
FIG. 2 is an exploded perspective view of a track fitting assembly.
Figure 4:
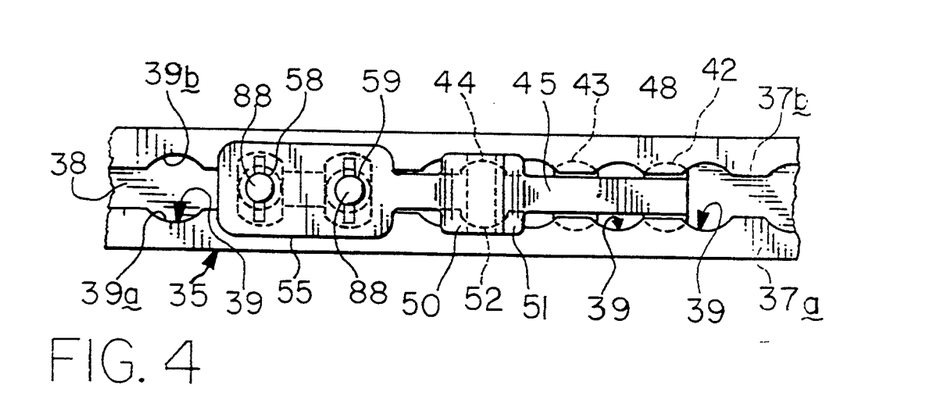
FIG. 4 is a top plan view thereof.
Figure 6:
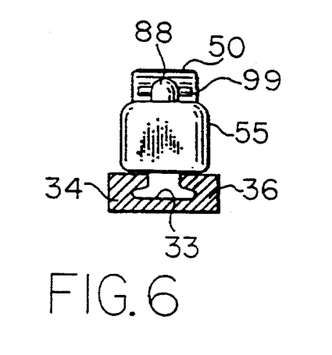
FIG. 6 is a cross-sectional view taken substantially along line 6—6 of FIG. 3.
Figure 15:
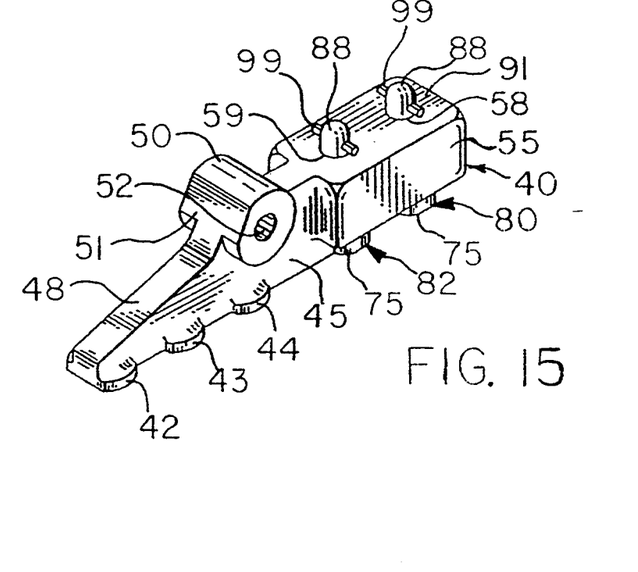
FIG. 15 is a perspective view showing the front, right side and top of the track fitting assembly.
Figure 16:
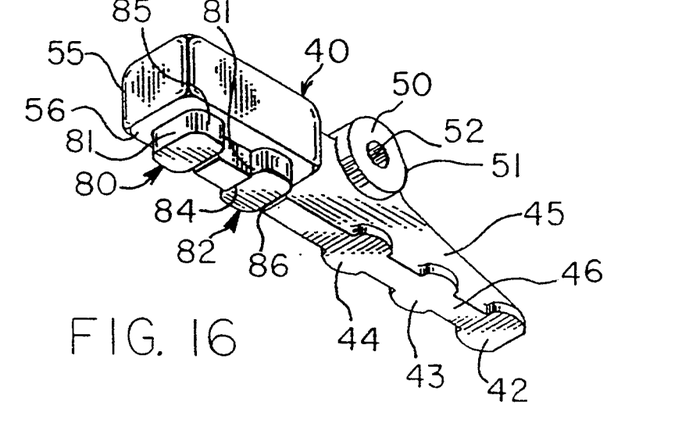
FIG. 16 is a perspective view showing the bottom, rear and left side thereof.

As best illustrated in FIGS. 2, 15 and 16 of the drawing, the body portion 40 of each track fitting assembly includes a long narrow finger portion 45 on the front end of body 40 and an enlarged boss portion 55 on the rear end of body 40. As best illustrated in FIGS. 4 and 9 of the drawing, the finger portion 45 of the body 40 of the track fitting assembly has a width which is equal to or less than the width of the groove 38, formed between flanges 37a and 37b of track 35, such that finger portion 45 is positionable in groove 38 to position the lower surface 46 on finger portion 45 in sliding engagement with the upper surface of the bottom wall 33 of track 35.

The narrow finger portion 45 of each track fitting has a plurality of spaced track lugs 42, 43 and 44 formed thereon, track lugs 42, 43 and 44 being equally spaced and corresponding to the spacing of receptacles 39 formed by crescent-shaped recesses 39a and 39b formed in flanges 37a and 37b of track 35. Upper surfaces of track lugs 42, 43 and 44 are positioned adjacent the lower side of flanges 37a and 37b in track 35. Lower surfaces of track lugs 42, 43 and 44 are positioned adjacent the upper surface of bottom wall 33 of track 35 and may be positioned in sliding relation therewith, if it is deemed expedient to do so.

In the illustrated embodiment, lower surface 46 on finger portion 45 of the body 40 and lower surfaces on track lugs 42, 43 and 44 lie in a common plane. However, it should be appreciated that surface 46 and surfaces on the bottom of at least some of the lugs 42, 43 and 44 may be configured to lie in different planes if it is deemed expedient to do so.

Figures 3, 5:
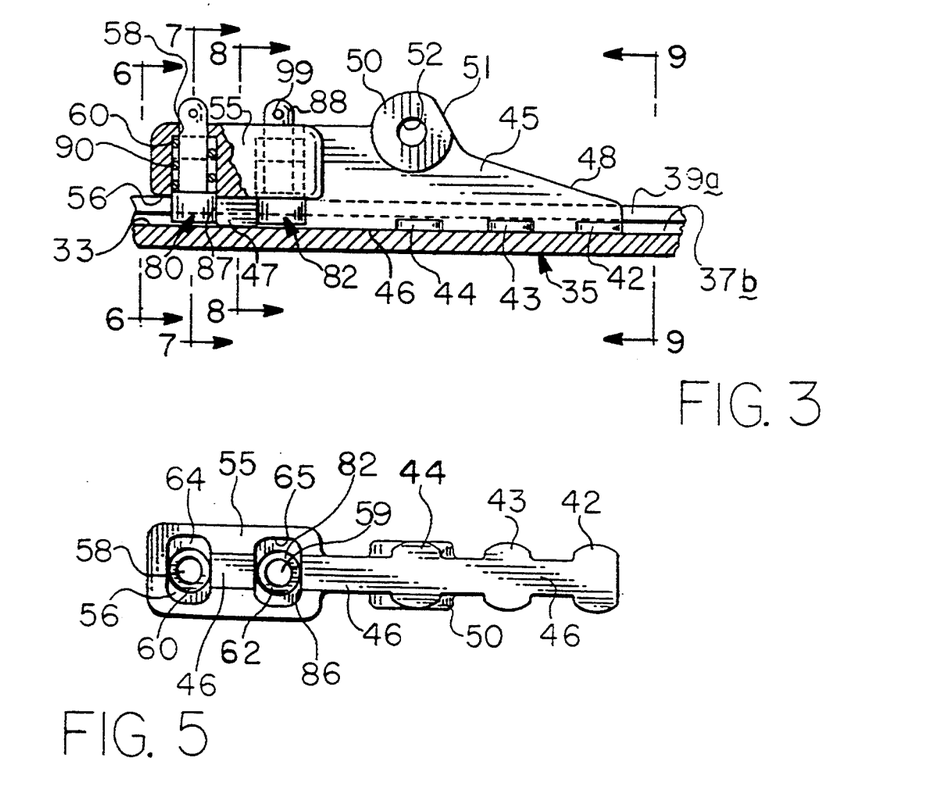
FIG. 3 is a side elevational view of the track fitting assembly illustrated in relation to a track.
FIG. 5 is a bottom plan view, with the plungers removed to more clearly illustrate details of construction.

As best illustrated in FIG. 3 of the drawing, the elongated narrow finger portion 45 has an inclined upper surface 48 to form a tapered beam member on one end of the body 40 which extends downwardly from a generally cylindrical central hub 50 having a hole 52 extending transversely of the length of finger portion 45.

Hole 52 may be tapered toward its center if it is deemed expedient to do so to allow the track fitting assembly 40 to pivot, for example, 10 degrees, side-to-side for installation of seats in some commercial aircraft. If the track fitting is not to pivot side-to-side, hole 52 may be formed with a uniform diameter along its entire length.

Hub 50 has a flat 51 formed on its outer surface. The flat surface 51 is for a particular application on the leg of a military aircraft seat leg. This flat surface 51 could be eliminated for other uses.

As best illustrated in FIGS. 2, 4, 15 and 16 of the drawing, the rear boss portion 55 on track assembly body 40 is significantly wider than the width of the finger portion 45 of body 40, the width of boss portion 55 being greater than the diameter of receptacles 39 formed by the crescent-shaped openings 39a and 39b in flanges 37a and 37b of track 35.

As best illustrated in FIG. 3 of the drawing, the lower surface 56 of boss 55 rides on upper surfaces of flanges 37a and 37b when the lower surface 46 of the finger portion 45 of body 40 is in engagement with the upper surface of the bottom wall 33 of track 35.

As best illustrated in FIGS. 2, 3, 5 and 15 of the drawing, a pair of spaced apertures 58 and 59 extend through the upper wall of boss portion 55 and bores 60 and 62 are concentrically formed to form a spring guide socket, as will be hereinafter more fully explained. As illustrated in FIG. 5 of the drawing, generally rectangular shaped recesses 64 and 65, having rounded corners, are formed in the boss portion 55 of body member 40 to receive a pair of plungers 80 and 82.

As best illustrated in FIGS. 3, 5 and 16 of the drawing, the recess 65 extends through the bottom surface 46 of narrow finger portion 45 and into boss portion 55 of the body 40 of the track fitting assembly forming a pair of spaced shoulders 84 and 86 which are slidably engaged by surfaces 81 and 83, best illustrated in FIGS. 2 and 16 on plunger 82 to prevent rotation of plunger 82 about a generally horizontal axis, as viewed in FIG. 3 of the drawing, resulting from torsional loading which might result from acceleration or deceleration of the aircraft.

Recess 64 extends through the bottom surface 46 of narrow finger portion 45 to form a continuous shoulder surface 87 extending along one side of plunger 80.

Referring to FIG. 2 of the drawing, each plunger 80 and 82 has an enlarged head portion 75 having generally parallel side surfaces 81 and 83 formed thereon adjacent opposite ends by curved end surfaces 85. Each plunger 80 and 82 has a stem portion 88 having a smaller diameter than the minimum dimension of the head portion 75 forming a shoulder 76. The shoulder 76 on each plunger 80 and 82 is engaged by the lower end of springs 90 which extend into each of the recesses 64 and 65 in boss portion 55 and into bores 60 and 62. It should be readily apparent that plungers 80 and 82 are independently urged by springs 90 toward the position illustrated in FIG. 3 of the drawing wherein lower ends of enlarged head portions 75 on plungers 80 and 82 engage the upper surface of bottom wall 33 of track 35.

As will be hereinafter more fully explained, an opening 91 is formed in the stem 88 of each plunger 80 and 82 for receiving pins 99 to facilitate connecting the plungers to an actuating arm 95.

As illustrated in FIGS. 3 and 16 rear segment 47 of the finger portion 45 of body member 40 stabilizes plungers 80 and 82 against movement.

Referring to FIG. 1 of the drawing, lower ends of seat legs 24 and 26 have clevises 24a and 26a, respectively, formed thereon into which bosses 50 on each track fitting assemblies 40A and 40B are connectable by bolts 31 and 32.

Figure 13:
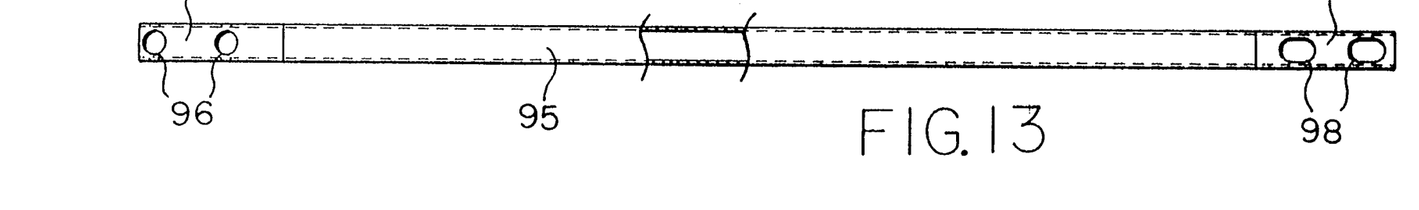
FIG. 13 is a bottom plan view of the actuating arm.

An actuating arm 95, illustrated in FIGS. 1, 10, 12 and 13 is formed by an elongated square tubular member having circular pin holes 92 formed in the sides of one end of arm 95 and having elongated pin holes 94 formed in the sides of the opposite end of arm 95. As illustrated in FIG. 13, circular openings 96 are formed in the bottom surface of one end of the tubular actuating arm 95 and a pair of elongated, generally elliptically shaped openings 98 are formed in the opposite end thereof. Upper ends of the stem portions 88 of plungers 80 and 82 extend into openings 96 and 98 and are retained in position by pins 99 which extend through openings 91 in upper ends of stems 88.

A pair of generally rectangularly shaped ware plates 96a and 98a are secured to the lower surface of actuating arm 95 to engage the upper surface of boss portion 55 of each track fitting assembly body 40. Ware plates 96a and 98a have openings corresponding to the shape and positions of openings 96 and 98.

It should be readily apparent that elongated openings 98 in the bottom of actuating arm 95 and elongated pin holes 94 in sides of actuating arm 95 allow one of the track fitting assemblies 40a or 40b to pivot relative to the other when actuating arm 95 is moved vertically.

Figure 11:
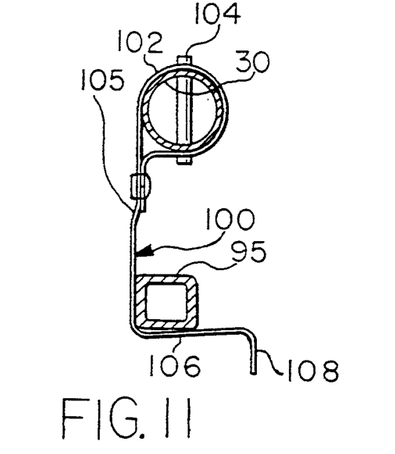
FIG. 11 is a cross-sectional view taken along line 11—11 of FIG. 10.
Figure 12:
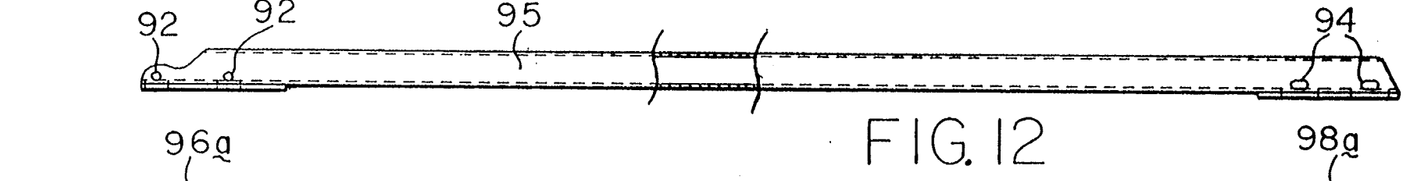
FIG. 12 is a side elevational view of the actuating arm.

As best illustrated in FIGS. 1, 10 and 11 of the drawing, a retainer clip 100 is secured to torque tube 30 and is positioned to releasably engage actuating arm 95.

Figure 14:
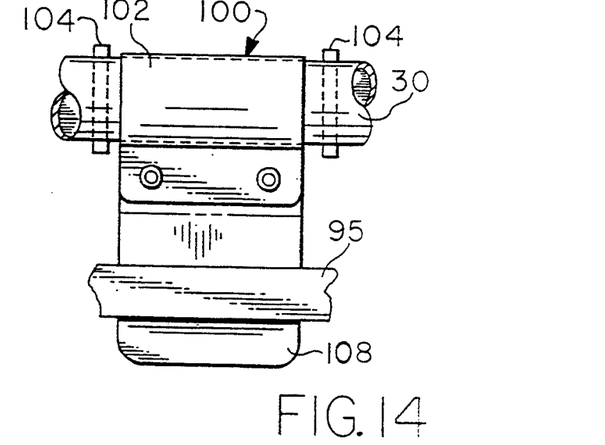
FIG. 14 is a fragmentary elevational view of the actuating arm retainer clip.

Referring to FIG. 11 of the drawing, clip 100 has a loop 102 formed in the upper end thereof through which torque tube 30 extends. As illustrated in FIGS. 11 and 14, a pair of locator pins 104 are positioned adjacent opposite sides of clip 100 to limit movement of clip 100 longitudinally of torque tube 30. A deformable leg 105 extends downwardly from loop 102 and has a substantially horizontally extending lower ledge portion 106 configured to form a guide surface 108 at the lower extremity thereof.

Clip 100 is configured to grippingly engage actuating arm 95 after it has been urged upwardly retracting plungers 80 and 82 into recesses 64 and 65 formed in the boss portion 55 on body 40. When guide surface 108 is moved rearwardly from the position illustrated in FIG. 11 of the drawing to release the actuating arm 95, springs 90 urge plungers 80 and 82 downwardly to a position wherein the horizontally extending ledge portion 106 of the clip is substantially parallel with the upper surface of actuating arm 95.

Plungers 80 and 82 are spaced apart a distance equal to the spacing of track lugs 42, 43 and 44. However, the spacing between track lug 44 and plunger 82 is one and a half times the spacing between track lugs 42, 43 and 44. Thus, when plungers 80 and 82 enter receptacles 39 formed by crescent-shaped recesses 39a and 39b, upper surfaces of track lugs 42, 43 and 44 are positioned below the segments of flanges 37a and 37b extending between the crescent-shaped recesses 39a on flange 37a preventing vertical movement of track lugs 42, 43 and 44 relative to track 35. Plungers 80 and 82 prevent movement of track fitting body 40 longitudinally of track 35 until plungers 80 and 82 are elevated from the position illustrated in FIG. 3 of the drawing by applying an upwardly directed force on actuating arm 95. It should be readily apparent that application of an upwardly directed force on actuating arm 95 simultaneously retracts plungers 80 and 82 in each of the track fitting assemblies 40a and 40b thereby disengaging the entire seat leg and track fitting assembly 20 from track 35. Upward force on the actuating arm 95 on the seat leg and track fitting assembly at the opposite end of the seat will release track fittings on that end of the seat relative to the track in which it is supported. Movement of clip 100 to the position illustrated in FIG. 14 of the drawing retains actuating arm 95 in its elevated position until the clip 100 is manually moved to disengage the actuating arm 95 to permit spring urged plungers 80 and 82 to move to their extended positions.

The body portion 40 of the track fitting is preferably made in a drop hammer forge or by casting and is then machined to form recesses 64 and 65 into which plungers 80 and 82 extend. Machining of the body 40 is minimal which permits construction of the apparatus at a cost which is approximately half of the cost of track fittings heretofore devised.

Track fitting assemblies 40a and 40b permit installation of a seat in an aircraft in about fifteen to twenty seconds. Heretofore, ten to fifteen minutes has been required for installing or disconnecting a seat. Further, no tools are required to either install or disconnect track fittings 40a and 40b.

Since track fittings 40a and 40b are pivotally connected to legs 24 and 26 of the leg assembly 22, the body portion 40 of each track assembly is free to move slightly to facilitate positioning track lugs 42, 43 and 44 in recesses in track 35.

It should be appreciated that modifications in the structure of the track fitting assembly 40 may be made without departing from the basic concept of the invention. For example, under certain operating conditions, it may be expedient to eliminate one or more of the track fitting lugs 42, 43 and 44 and to eliminate at least one of the plungers 80 and 82.

To meet specifications for relatively light loading, a single plunger 82 may be employed in combination with a single track fitting lug 42 for securing fitting 40 to a track 35.

In some applications, a single track fitting 40 may be installed, for example, only on the rear leg of a seat. If a single track fitting is used, instead of a pair of track fittings on front and rear legs, actuating arm 40 may be reconfigured in the form of an over center cam for maintaining a single plunger 82 or a pair of plungers 80 and 82 on a single track fitting assembly 40 in the elevated or extended positions.

It should further be appreciated that actuating arm 95 in the illustrated embodiment may be reconfigured to provide a curved bail or to provide shaped inclined surfaces on opposite ends of actuating arm 95 for actuating plungers vertically when actuating arm 95 is moved in a horizontal direction.

We contemplate mounting a link between stems 88 on plungers 80 and 82 such that movement of the link will actuate plungers 80 and 82 on a single track fitting assembly 40. An actuating member similar to actuating arm 95 is then connected to links on multiple track fitting assemblies for simultaneously actuating plungers in more than one assembly. Further, it is contemplated that a connector link may extend across the width of the seat and be connected to central portions of actuating arms 95 which are connected to track fitting assemblies on opposite sides of the seat. Movement of the connector link will then simultaneously move more than one actuating arm 95 for retracting plungers 80 and 82 for example, in four track fitting assemblies.

We contemplate using a single track fitting assembly having at least one track fitting lug 42 and at least one plunger 80 for anchoring a load to a track. Several track fitting assemblies may be used in combination, depending upon the load carrying requirements of the anchor.

Terms such as horizontal, vertical, upper and lower are used to describe the illustrated embodiments of the invention and should not be construed as limiting the scope of the invention.

We claim:

1. A plurality of track fittings for removably securing a seat to a generally channel-shaped track having an elongated groove formed between a pair of flanges, each of the flanges having spaced aligned generally crescent-shaped openings positioned to form a series of spaced receptacles having flange segments extending between the receptacles, each of said track fittings comprising: a body member having a narrow finger portion which has a width less than the width of the groove formed in the track and an enlarged boss portion; a plurality of spaced track lugs projecting laterally from said narrow finger portion, said enlarged boss portion having a recess formed therein, said recess extending through said narrow finger portion to form a pair of shoulders adjacent opposite sides of said recess; plunger means in said recess, said plunger means and said track lugs having a width greater than the width of the groove formed in the track, said plunger means having surfaces positioned between said shoulders such that said shoulders limit movement of said plunger means; an elongated actuating member having opposite ends; and means securing an end of said actuating member to said plunger means movably secured to said spaced body members, said actuating member being adapted to simultaneously move plungers in each of said body members between a first position wherein the lower end of said plunger means is positioned adjacent the lower edge of said narrow finger portion of the body and an elevated position wherein the lower end of the plunger means is retracted from the spaced receptacles formed in the track.

2. A track fitting according to claim 1, with the addition of: means to pivotally secure said body member to a seat leg.

3. A track fitting according to claim 1, said body member comprising: a forged member having a recess formed therein, said plunger means extending into said recess.

4. A track fitting according to claim 3, said plunger means comprising: a head having a pair of spaced parallel surfaces engageable with said shoulders and a lower surface movable between a first position wherein the lower surface of the plunger and the lower surface of the narrow elongated finger lie in a common plane and a second position wherein the lower end of the plunger is elevated above the plane.

5. A track fitting according to claim 4, the recess in said body member being formed by a generally circular bore configured to retain the upper end of a spring; and a non-circular recess configured to receive said head on said plunger means.

6. A track fitting according to claim 1, said body member comprising: a forged elongated fitting body, said narrow finger portion extending along substantially the entire length of said body member, said enlarged boss portion being formed adjacent one end of said fitting body member; a hub formed on said fitting body member adjacent said boss portion, said hub having a hole extending therethrough.

7. A track fitting according to claim 6, said recess comprising: an aperture extending through said boss portion, a bore formed in said boss portion and communicating with said aperture, said recess further including a generally rectangular shaped socket communicating with said bore, said bore being configured to form a spring guide.

8. A track fitting according to claim 7, said plunger means having a plunger head and a stem configured to form a shoulder on said plunger means; and spring means in said recess, said spring means having a first end projecting into said bore and a second end engageable with said shoulder on said plunger means.

9. A track fitting for removably securing a seat to a generally channel-shaped track having an elongated groove formed between a pair of flanges, each of the flanges having spaced aligned generally crescent-shaped openings positioned to form a series of spaced receptacles having flange segments extending between the receptacles, said track fitting comprising: a body member having a narrow finger portion which has a width less than the width of the groove formed in the track and an enlarged boss portion; a plurality of spaced track lugs projecting laterally from said narrow finger portion, said enlarged boss portion having a recess formed therein, said recess extending through said narrow finger portion to form a pair of shoulders adjacent opposite sides of said recess; and a plunger in said recess, said plunger and said track lugs having a width greater than the width of the groove formed in the track, said plunger having surfaces positioned between said shoulders such that said shoulders limit rotational movement of said plunger when said plunger is in an extended position wherein said plunger extends into at least one of said receptacles and the lower end of said plunger is positioned adjacent the lower edge of said narrow finger portion of said body, said plunger being movable between said extended position and an elevated position wherein the lower end of the plunger is retracted from the spaced receptacles formed in the track.

10. A seat leg and track fitting assembly connectable to a track comprising: front and rear legs; support means extending between said front and rear legs; a pair of track fittings; means securing one of said track fittings to each of said front and rear legs for pivotal movement about a generally horizontally axis; actuating means connected to said first and second track fitting means; and retainer clip means secured to said support means, said retainer clip means being movable to cooperate with said actuating means for selectively retaining each said track fitting means in locked and unlocked positions.

11. A seat leg and track fitting assembly according to claim 10, wherein the track comprises: a generally channel-shaped track having an elongated groove formed between a pair of flanges, each of the flanges having a series of spaced receptacles formed between flange segments, said track fitting means comprising: a body member; a finger portion on said body member which has a width less than the width of the groove formed in the track; a boss portion on said body member; a plurality of spaced track lugs projecting laterally from said finger portion, said boss portion having a recess formed therein, said recess extending through said finger portion to form a pair of shoulders adjacent opposite sides of said recess; plunger means in said recess, said plunger means and said track lugs having a width greater than the width of the groove formed in the track, said plunger means having surfaces positioned between said shoulders such that said shoulders limit movement of said plunger means, said actuating means being secured to said plunger means to move said plunger means in said recess between a first extended position wherein the lower end of said plunger means is positioned adjacent the lower edge of said finger portion of the body and a second retracted position wherein the lower end of the plunger means is retracted from the spaced receptacles formed in the track.

12. A seat leg and track fitting assembly according to claim 11, said actuating means comprising: a rigid elongated member having opposite ends; and means securing each end of said rigid elongated member to plunger means movably secured to spaced body members, said actuating member being adapted to simultaneously move plungers in each of said body members.

13. A seat leg and track fitting assembly according to claim 11, with the addition of: means to pivotally secured said body member to a seat leg.

14. A seat leg and track fitting assembly according to claim 11, said body member comprising: a forged body member having a recess formed therein, said plunger means extending into said recess.

15. A seat leg and track fitting assembly according to claim 14, said plunger means comprising: a head portion having a pair of spaced parallel side surfaces engageable with said shoulders and a lower surface movable between a first position wherein the lower surface on the plunger and the lower surface on the elongated finger lie in a common plane and a second position wherein the head portion of the plunger means is spaced from said plane.

16. A seat leg and track fitting assembly according to claim 15, the recess in said body member being formed by a generally circular bore configured to retain the upper end of a spring; and a noncircular recess configured to receive said head on said plunger means.

17. A seat leg and track fitting assembly comprising: a seat leg assembly; a front leg on said seat leg assembly; a rear leg on said seat leg assembly; a pair of track fitting assemblies; means movably securing one of said track fitting assemblies to each of said front and rear legs of said seat leg assembly; a locking plunger having an engaged and a disengaged position on each of said track fitting assemblies to secure each said track fitting assembly to prevent movement longitudinally of a track; and an actuating member secured to said locking lug on said first and second track fitting assemblies, said actuating member being adapted to simultaneously actuate locking plungers on each of said track fitting assemblies between said engaged and disengaged positions.

* * * * *

UNITED STATES PATENT AND TRADEMARK OFFICE
CERTIFICATE OF CORRECTION

PATENT NO.    : 5,337,979

DATED         : August 16, 1994

INVENTOR(S)   : Randy J. Bales, Klay E. Gilbert & Steven R. Bell

It is certified that error appears in the above-identified patent and that said Letters Patent is hereby corrected as shown below:

Column 1, lines 8 and 9, change "(now patent Ser. No. 333,420)" to read --(now Patent No. Des. 333,420)--.

Column 10, line 50, delete "lug" and insert --plungers--.

Signed and Sealed this

Twenty-second Day of November, 1994

Attest:

BRUCE LEHMAN

Attesting Officer    Commissioner of Patents and Trademarks